June 22, 1965  A. E. HILLIKER  3,191,148
MODULAR PLURAL SINGLE-PHASE TIMERS TRAFFIC SIGNAL CONTROLLER
Filed Jan. 2, 1962  11 Sheets-Sheet 1

INVENTOR:
ARTHUR E. HILLIKER,
BY D. Emmett Thompson
HIS ATTORNEY.

June 22, 1965  A. E. HILLIKER  3,191,148
MODULAR PLURAL SINGLE-PHASE TIMERS TRAFFIC SIGNAL CONTROLLER
Filed Jan. 2, 1962  11 Sheets-Sheet 3

FIG.4

INVENTOR:
ARTHUR E. HILLIKER,
BY D. Emmett Thompson
HIS ATTORNEY.

June 22, 1965    A. E. HILLIKER    3,191,148
MODULAR PLURAL SINGLE-PHASE TIMERS TRAFFIC SIGNAL CONTROLLER
Filed Jan. 2, 1962    11 Sheets-Sheet 5

FIG.6

INVENTOR:
ARTHUR E. HILLIKER,
BY *D. Emmitt Thompson*
HIS ATTORNEY.

June 22, 1965

A. E. HILLIKER 3,191,148

MODULAR PLURAL SINGLE-PHASE TIMERS TRAFFIC SIGNAL CONTROLLER

Filed Jan. 2, 1962

INVENTOR:
ARTHUR E. HILLIKER,
BY *A. Emmett Thompson*
HIS ATTORNEY.

FIG. 8.

INVENTOR:
ARTHUR E. HILLIKER,
BY *Q. Emmett Thompson*
HIS ATTORNEY.

June 22, 1965  A. E. HILLIKER  3,191,148
MODULAR PLURAL SINGLE-PHASE TIMERS TRAFFIC SIGNAL CONTROLLER
Filed Jan. 2, 1962  11 Sheets-Sheet 8

INVENTOR:
ARTHUR E. HILLIKER,
BY *D. Emmett Thompson*
HIS ATTORNEY.

June 22, 1965

A. E. HILLIKER 3,191,148

MODULAR PLURAL SINGLE-PHASE TIMERS TRAFFIC SIGNAL CONTROLLER

Filed Jan. 2, 1962

INVENTOR:
ARTHUR E. HILLIKER,

BY *Q. Emmett Thompson*

HIS ATTORNEY.

June 22, 1965  A. E. HILLIKER  3,191,148
MODULAR PLURAL SINGLE-PHASE TIMERS TRAFFIC SIGNAL CONTROLLER
Filed Jan. 2, 1962  11 Sheets-Sheet 10

FIG.13.

INVENTOR:
ARTHUR E. HILLIKER,
BY *Emmett Thompson*,
HIS ATTORNEY.

FIG. 14

3,191,148
MODULAR, PLURAL SINGLE-PHASE TIMERS
TRAFFIC SIGNAL CONTROLLER
Arthur E. Hilliker, Pulaski, N.Y., assignor to Crouse-Hinds Company, Syracuse, N.Y., a corporation of New York
Filed Jan. 2, 1962, Ser. No. 163,611
7 Claims. (Cl. 340—37)

This invention relates to and has as a general object a new and improved traffic signal controller.

Prior to this time, all the commercial traffic signal controllers have been of the cyclical type. That is, the traffic signals for two or more intersecting traffic lanes have been controlled by a controller which moved through a cycle to successively present the right-of-way signal display to the various intersecting lanes. This cyclical movement was effected either by a motor driven cam unit, or by a plurality of stepping switches.

All such controllers operate in one of two manners. First, the controller is continuously cycled to successively present the right-of-way to the various lanes independently of the amount of traffic on the lanes. This type of controller is known as a pre-timed controller.

The second type is one in which one or more of the intersecting lanes is provided with detector means which is actuated by the presence of traffic in that lane to cycle the controller to that lane to present the right-of-way signal display. Thus, this type of controller operates in response to the traffic present on the various lanes, and is known in the trade as an actuated controller.

All such cyclical controllers become inefficient when the intersection is made up of more than two intersecting traffic lanes. This is so because in a three-lane intersection, for example, if the right-of-way signal display is being presented to the first street, and there is no traffic on the second and third streets, the pre-timed controller will continue to cycle to present the right-of-way to the second and third streets, regardless of this fact. Actuated controllers in this situation will maintain the right-of-way signal display on the first street until there is a call on one of the other two streets. If there is a call on the third street, the controller will cycle through the second street phase to present the right-of-way signal display to the second street, even though there is no traffic on this street. This defect in operation of the actuated controller has been remedied by the invention which is the subject of the Jeffers' application Serial No. 47,492, filed August 4, 1960, now U.S. Patent No. 3,146,421. However, where the intersections comprises four or more intersecting lanes, the controller embodying the invention of the Jewers' application is impractical. This is so for the reason that in cyclical actuated cntrollers, each phase must be passed through when the controller is cycling from a first phase to a later phase, and, for example, when the controller is presenting the right-of-way signal display to a first lane, and a call is received on a fourth lane, while no calls are received on the second and third lanes, the controller must cycle through the portions of the complete cycle allotted to the second and third lanes before the fourth phase is reached. This means that the controller must be provided with means to skip the presentation of the right-of-way signals in the second and third phases. Such arrangements become impractical and expensive where there are four or more intersecting lanes to be controlled.

Accordingly, it is a more specific object of this invention to provide a modular traffic signal controller wherein the controller is made up of a plurality of individual modules, or phase timers so as to render the controller non-cyclical in operation.

Further, it is an object of this invention to provide a new and improved traffic signal controller for a plurality of intersecting traffic lanes wherein the right-of-way signal display for the lanes may be transferred directly from one phase to any of the other phases without the necessity for passing through any uncounted phases.

Further, it is an object of this invention to provide a traffic signal controller for a plurality of intersecting lanes wherein the controller operates to establish a right-of-way signal display transfer sequence in a logical order dependent upon the order in which the controller receives calls from vehicles actuating detector means associated with each of the intersecting lanes.

It is an additional object of this invention to provide a traffic signal controller of the type referred to which is universal in application, and wherein the controller may be expanded simply by adding a phase module or timer for each traffic movement which is to be controlled.

The invention consists in the novel features and in the combinations and constructions hereinafter set forth and claimed.

In describing this invention reference is had to the accompanying drawings in which like characters designate corresponding parts in all the views.

Figure 1:
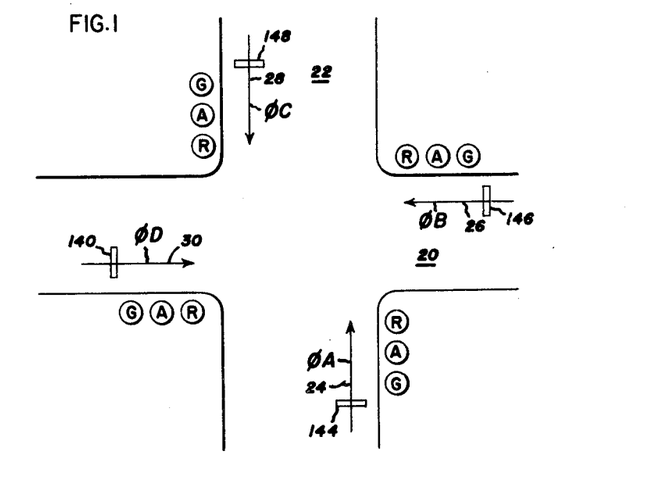
FIGURE 1 is a schematic illustration of the simplest type of intersection which the controller comprising the preferred embodiment of the invention may be employed to control.

In FIGURE 1, the invention will be shown and described as being employed in connection with a simple two-street intersection, wherein the intersecting streets have been designated 20 and 22. In FIGURE 1, the traffic approaching the intersection from the bottom of the figure on street 22 is designated the phase A movement, and is identified schematically by the arrow 24. In like manner, the traffic movements approaching the intersection from each of the other three approaches on street 20 and 22, are designated phase B, phase C and phase D, and are identified schematically by the arrows 26, 28 and 30, respectively. In this arrangement, each of the movements will receive the right-of-way signal display to the exclusion of all of the other movements so that traffic on each movement may proceed straight through the intersection, or make left, or right turns. As will be obvious, it is understood that the controller comprising the subject of this invention may be utilized in connection with all other types of intersections and may be arranged to control the traffic in such intersection in any manner desired.

The traffic signals for each of the movements are shown schematically adjacent each of the movements by the circles with the letters, G for green or proceed, A for amber, or clearance, and R for red, or stop, in accordance with conventional traffic signal color schemes.

Figure 2:
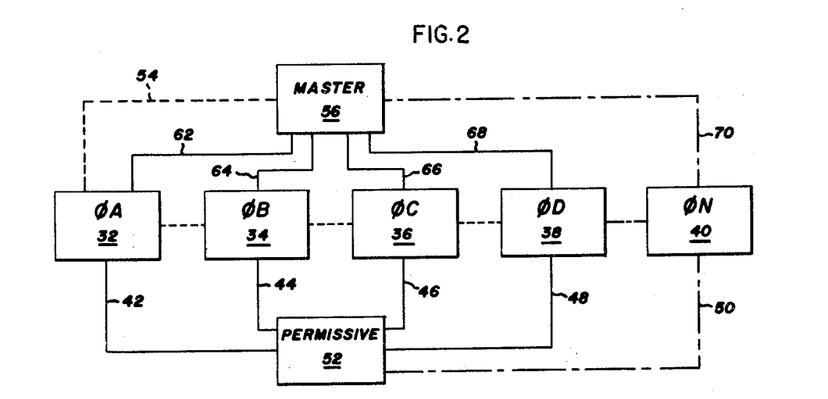
FIGURE 2 is a block diagram of the modular controller comprising the preferred embodiment of the invention.

In FIGURE 2 is shown the block diagram for the complete controller comprising the phase A module, or phase timer 32, phase B module 34, phase C module 36, phase D module 38, and a phase N module 40. The phase N module is shown to indicate that any number of modules may be assembled to comprise the complete controller. Each of the phase modules is connected by cables 42, 44, 46, 48 and 50, to a permissive circuit 52. A master cable 54 is connected from the master circuit 56 through each of the phase modules 32 to 40, inclusive, as is indicated by the dashed lines in FIGURE 2. Finally, each of the phase modules is connected by lines 62, 64, 66, 68 and 70 to the master circuit 56. The various connections between the phase N module 40, and the remainder of the complete controller are shown by the dash-dot line, in order to indicate that the controller is expandable, and that any number of phase modules, or timers may be added as is desired. However, the controller will be shown and described hereinafter as comprising only the A, B, C, and D phase modules.

Figure 3:
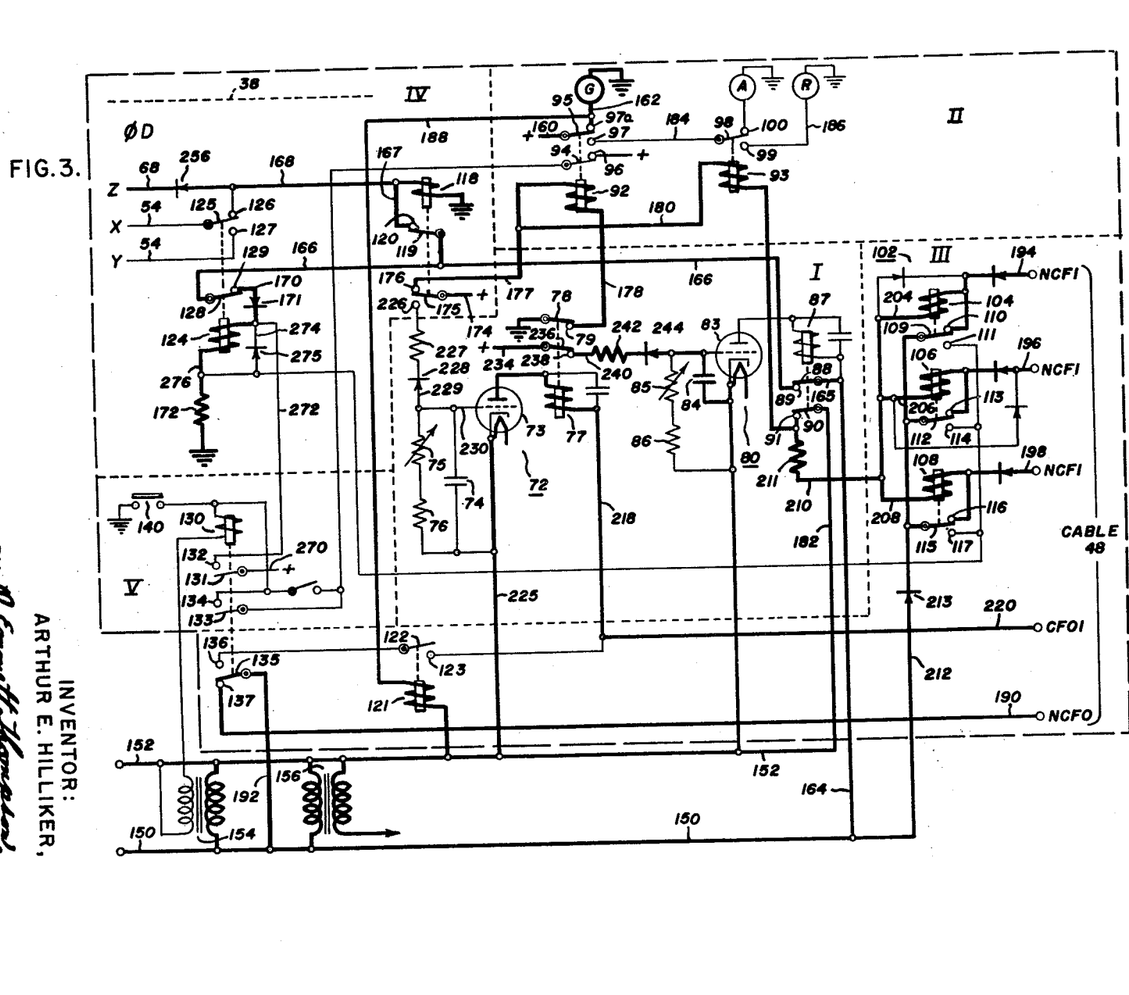
FIGURE 3 is a circuit diagram of an individual module, or phase timer wherein the heavy lines indicate the portions of the circuit then conducting current.

The circuit diagram for each of the phase modules, or timers, is identical and is shown in FIGURE 3, for purposes of description, will be assumed to be the phase D timer 38.

Referring to that figure, each of the timers is made up of 5 major components, as indicated by the dashed line position and identified by roman numerals I, II, III, IV, and V. Roman numeral I comprises timing means which includes a proceed timer 72 of the conventional RC type comprising tube 73, timing capacitor 74, variable resistor 75, fixed resistor 76 and plate relay 77, comprising armature 78 and fixed contact 79; a clearance timer 80 comprising tube 83, timing capacitor 84, variable resistor 85, fixed resistor 86, plate relay 87, including armature 88 and fixed contact 89, and armature 90, and fixed contact 91.

Roman numeral II identifies signal means which includes a pair of signal relays 92 and 93, the relay 92, including armature contacts 94 and 95, and fixed contacts 96, 97 and 97a; the relay 93 including armature contact 98, movable between fixed contacts 99 and 100.

Roman numeral III identifies permissive means which includes permissive circuit, generally designated by the reference numeral 102, comprising permissive relays 104, 106 and 108 having armatures 109 movable between fixed contacts 110 and 111, armature 112 movable between fixed contacts 113 and 114, and armature 115 movable between fixed contacts 116 and 117, respectively. The permissive means also includes an interrupting relay 121 having armature 122 and fixed contact 123 and the lower armature 135 movable between fixed contacts 136 and 137 of the detector relay 130.

Roman numeral IV identifies starting means which includes a starting relay 118 having an armature 119 and a fixed contact 120 and an armature 175 and fixed contact 176; and a transfer means comprising transfer relay 124 having an armatures 125 movable between the fixed contacts 126 and 127, and an armature 128 movable toward and away from a fixed contact 129.

Finally, each phase timer includes call means identified by roman numeral V, which comprises the detector relay 130 having an armature 131 movable into and out of engagement with a fixed contact 132, armature 133 movable into and out of engagement with a fixed contact 134 and a vehicle detector which, in the case of the phase timer D, shown in FIGURE 3, is identified as detector 140.

Figure 14:
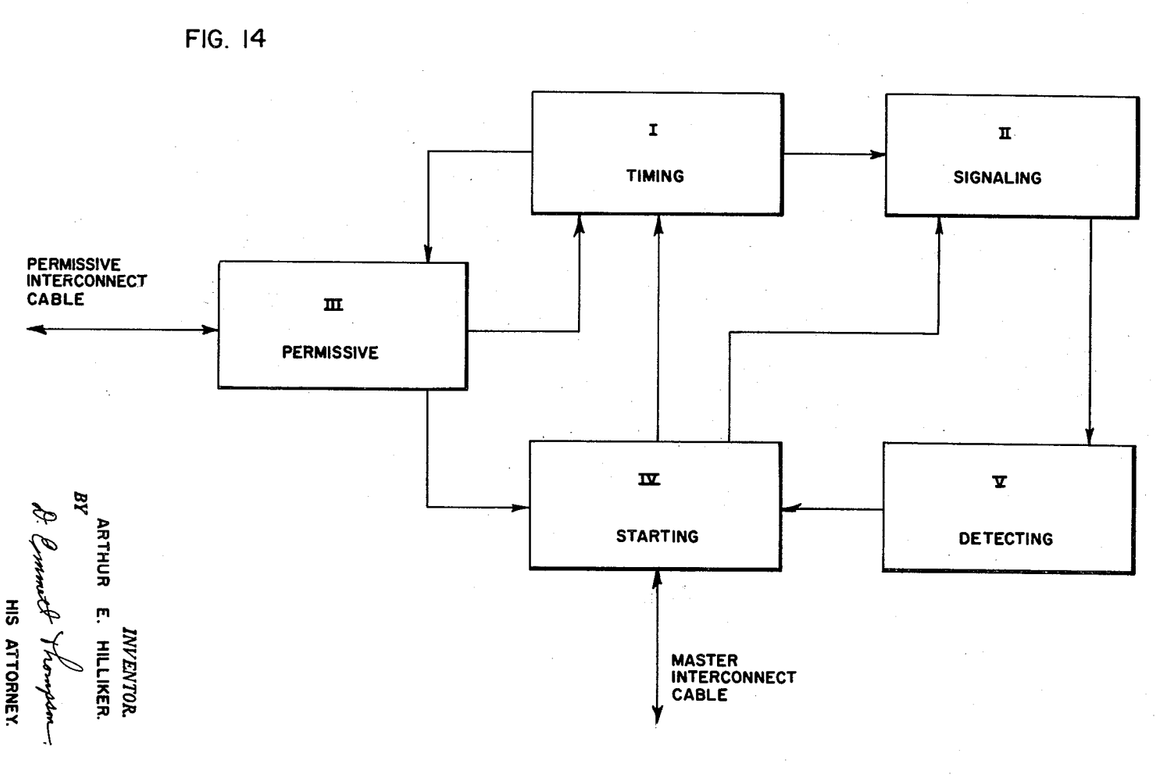
FIGURE 14 is a block function diagram of an individual phase timer or module.

FIGURE 14 is a block function diagram of a phase timer wherein each of the component parts above identified by roman numerals I to IV inclusive, is shown in block form, and is provided with a functional label wherein the interconnection between the various components of the phase timer, and the connections with the other timers and with the master unit are indicated by the arrowed lines.

As shown in FIGURE 1, the phase A traffic movement is provided with a vehicle detector 144, and detectors 146 and 148 are provided for the phase B and C. The detectors 140 to 148, inclusive, may be of any suitable type, as for example pressure actuated magnetic infra-red, radar, or sonic.

Referring again to FIGURE 3, the phase timer is provided with a source of power comprising hot line 150, and common or return line 152, across which are connected the primaries of a detector transformer 154, and a heater transformer 156 for the tubes 73 and 83, which have their heaters connected to the secondary of the transformer 156, as indicated.

For purposes of description and illustration, let it now be assumed that the controller is in a resting, or static condition with the proceed signal for the phase D movement, indicated by the arrow 30 on FIGURE 1, the energized condition. Let it be further assumed that the detector 144 associated with the phase A movement, indicated by the arrow 24 has been actuated. Referring now to FIGURE 3, which shows the condition of the phase D module controller 38 under this set of assumptions, with the heavy lines indicating the portion of the circuit conducting current, it will be seen that the relays 92 and 93 are energized. These relays became energized when the right-of-way signal display was transferred to the phase D movement and will be later described. When the relays are energized, however, a hot feed at point 160 is connected through the armature 95 and contact 97 of energized relay 92 to line 162, which is connected through the green or proceed signal, to ground to energize this signal.

It will be noticed from FIGURE 3 that the relays 124 and 118 are in the energized condition. Relays 118 became energized upon the transfer of the right-of-way to phase D, and is maintained in the energized state through the circuit comprising hot line 150, line 164, line 165, armature 88 and fixed contact 89 of relay 87 in timer 80, line 166, armature 119 and contact 120 of energized relay 118, line 165, line 168, which is connected through the coil of relay 118 to ground as indicated. Similarly, the hot feed on the line 166 is connected by the line 166 to armature 128 and fixed contact 129 of energized relay 124 to line 170, which is connected through rectifier 171 and the coil of relay 124 through a fixed resistor 172 to the ground point, as indicated, to maintain the relay 124 in the energized state.

The energization of the relay 118 connects a hot feed at point 174 through armature 175 and upper fixed contact 176 of the energized relay 118 to line 177, which is connected through the coil of relay 92 to line 178, which passes through fixed point 79 and armature 78 of plate relay 77 in timer 72 to ground, as indicated, thus energizing the relay 92 to energize the green signal for the phase D movement, as previously set forth. Similarly the relay 93 will be energized through the circuit consisting of hot line 174, armature 175 and contact 176 of energized relay 118, line 177, line 180, which passes through the coil of relay 93 to the fixed contact 91 and armature 90 of relay 87 and timer 80 and from the armature 90 by the line 182 to the ground line 152.

The energization of relay 93 broke the circuit for the red signal for phase D comprising the hot point 160, armature 95 and contact 97 of relay 92 and line 184 which is connected through the armature 98 and fixed contact 99 of relay 93 to line 186, which is connected, as indicated, by the circled letter R to the red signal.

The energization of the relay 92 also completes a circuit comprising hot line 160, armature 95 and contact 97a of energized relay 92 to line 188, which is connected through the coil of relay 121 to the ground line 152 to energize the relay 121 for a purpose to be hereinafter described.

It will now be assumed that when the right-of-way was initially transferred to the phase D movement, there were no vehicle actuations of the detectors associated with any of the phases A, B or C. Under this condition, a hot feed will be placed on the "no call feed-out" line (NCFO) 190, in each of the phase A, B and C modules. Referring to FIGURE 3, this circuit in each of the phase A, B and C modules will comprise hot line 150, line 192, armature 135 and contact 137 of de-energized detector relay 130 to line 190.

Figure 4:
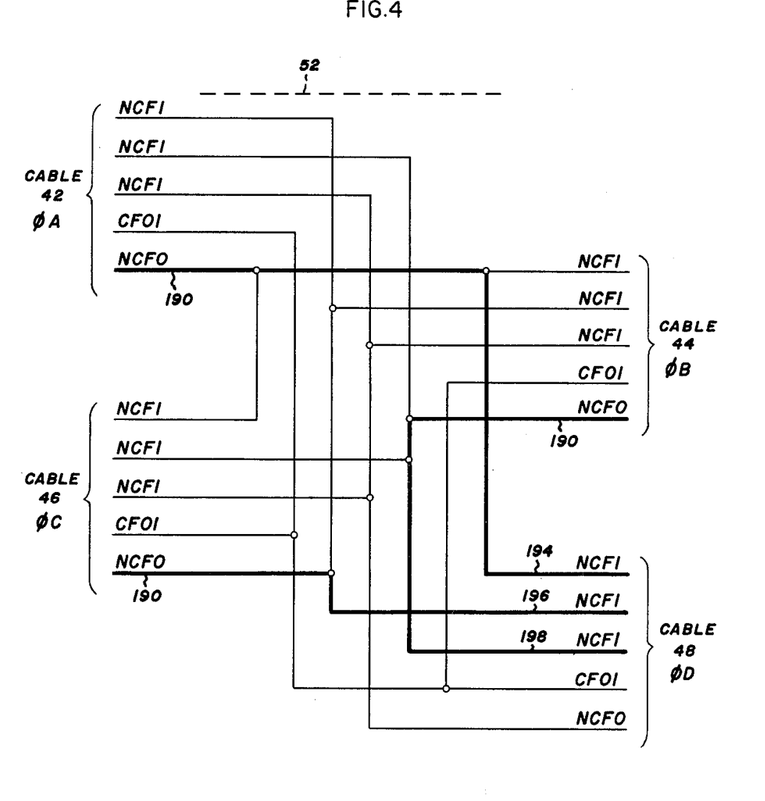
FIGURE 4 is a circuit diagram of the permissive circuit for the complete controller wherein the heavy lines indicate the portions of the circuit then conducting current.

Referring now to the permissive circuit shown in FIGURE 4, the hot feed from the NCFO circuits in each of the A, B and C modules will be connected, as shown in FIGURE 4, to the "no call feed-in" lines (NCFI) 194, 196 and 198 in the phase D module via the cable 48. Since the connections for the no call feed-out circuts from the modules A, B and C to the no call feed-in lines in the module D are clearly shown in FIGURE 4, no further description of these connections will be described.

Referring again to FIGURE 3, the hot feed on the NCFI lines 194, 196 and 198 in cable 48 will energize the relays 104, 106, and 108 in the permissive circuit 102 in the phase D module. These circuits comprise the hot feeds on the lines 194, 196 and 198, coils of relays 104, 106 and 108, and lines 204, and 206 and 208, which are connected to the line 210, and through resistor 211 to fixed contact 91 in armature 90 of relay 87 to the line 182 which is connected to the common return line 152. The energization of the relays 104, 106 and 108 completes a hold circuit to maintain each of the relays energized comprising hot line 150, line 212, which passes through the rectifier 213 and through the armatures 115, 112 and 109, and fixed contacts 116, 113 and 110, and the coils of relays 108, 106 and 104, respectively, and to ground, as just deescribed to maintain the relays in the energized state.

Figure 5:
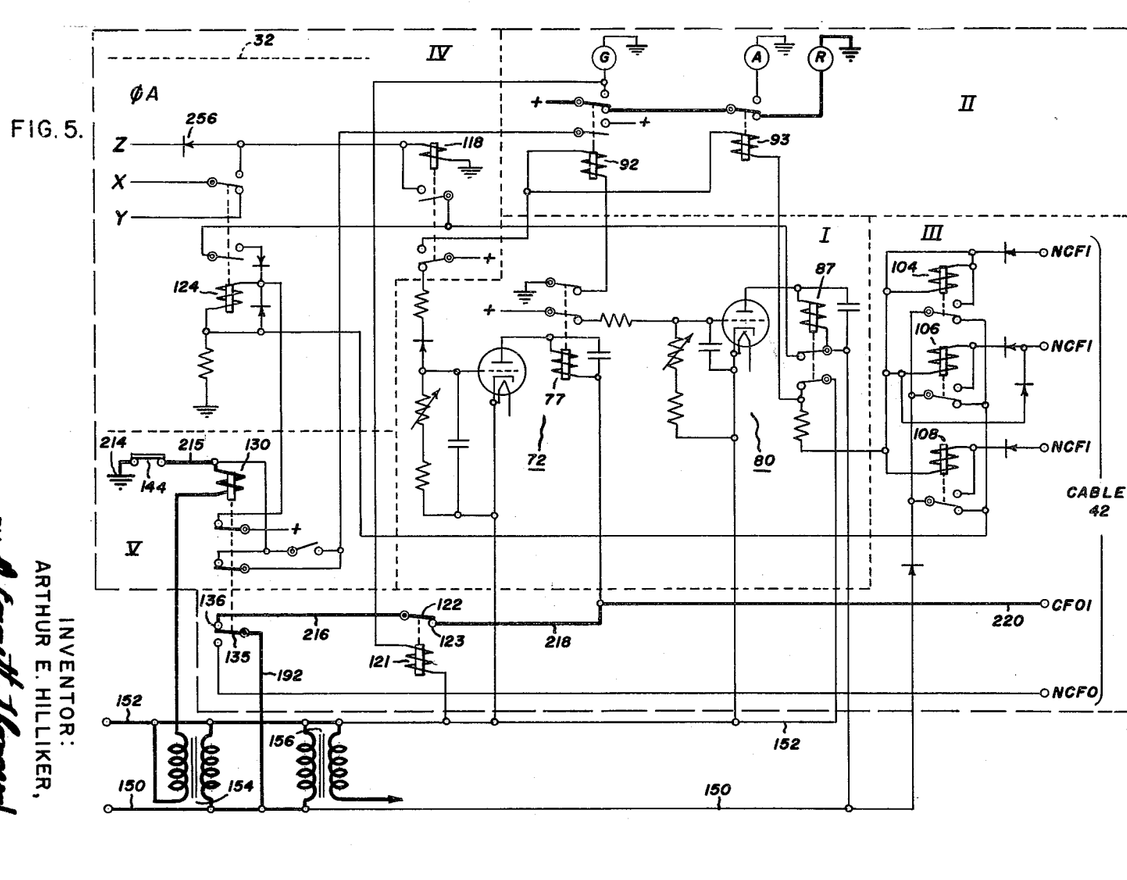
FIGURE 5 is a circuit diagram similar to FIGURE 3 of a different module or phase timer.
Figure 6:
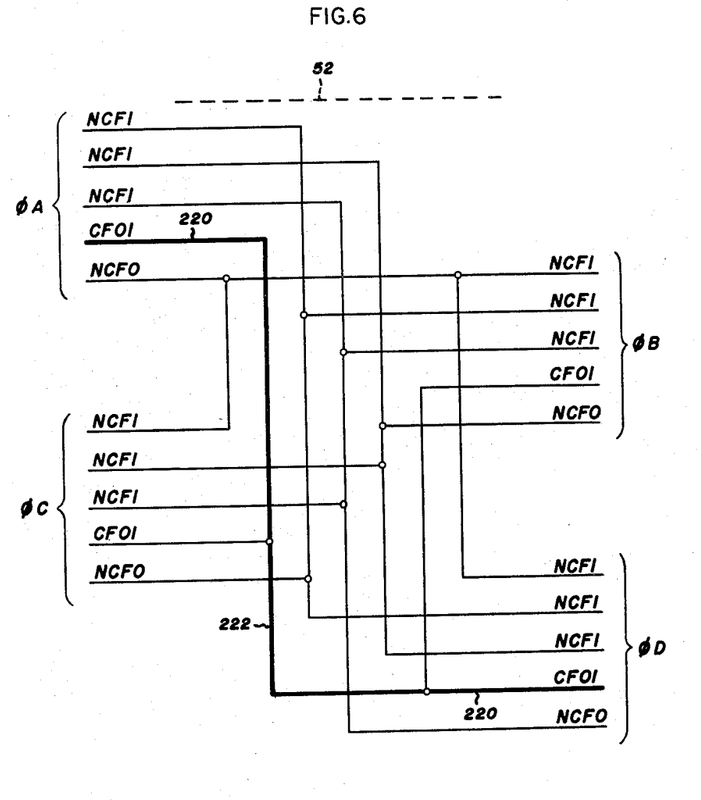
FIGURE 6 is a circuit diagram similar to FIGURE 4 shown in a different condition.

Referring now to FIGURE 5 wherein the phase A module is shown, an actuation of the phase A detector 144 will complete a circuit from the ground point 214, through the detector 144, line 215 and the coil of the detector relay 130 to the secondary of the detector relay transformer 154, thus energizing the relay 130. The energization of the relay 130 will cause the armature 135 to move into engagement with the upper fixed contact 136, thus completing a circuit from the hot line 150, line 192, armature 135 and contact 136 of energized relay 130, line 216, armature 122, and contact 123 of relay 121 to line 218, which is connected to line 220. The line 220 is a "call feed-out-in" circuit (CFOI), and, as will be seen by referring now to FIGURE 6, the hot feed on the line 220 will be connected through the permissive unit 52 by line 222 to the line 220 in the phase D timer, which is the "call feed-out-in" circuit in the phase D module, as shown in FIGURE 3.

Referring again to FIGURE 3, the hot feed on the CFOI line 220, just described, will be connected by line 218 through the coil of the plate relay 77 of timer 72 and through the tube 73 and line 225 to the ground line 152. As will be obvious, however, the circuit cannot be completed through the tube 73 until the grid bias on the grid of the tube has been removed. This bias is normally maintained through the circuit comprising the hot point 174 and armature 175 of relay 118, contact 226, resistor 227 and rectifier 228 in line 229 which is connected by line 230 to the top of the timing capacitor 74 and the grid of the tube 73. This circuit charges and maintains the charge on the capacitor 74 and the grid bias on the grid of the tube 73 thus preventing the tube from conducting current and energizing the plate relay 77.

This charge circuit, however, became broken upon the energization of the relay 118, as previously described. Accordingly, simultaneously with the energization of the green signal for the phase D traffic movement, the capacitor 74 began to discharge through the line 230 and the variable resistor 75 and fixed resistor 76 which are connected in the line 229 to the line 225, which is connected to the common return line 152. Consequently, the setting on the variable resistor 75 and the value of the fixed resistor 76 determine the amount of time necessary to discharge the capacitor 74, and hence regulate the length of the green or proceed signal interval. When the capacitor 74 has discharged sufficiently to remove the grid bias from the tube 73, the circuit above described for the plate relay 77 will be completed to energize the plate relay 77.

Figure 7:
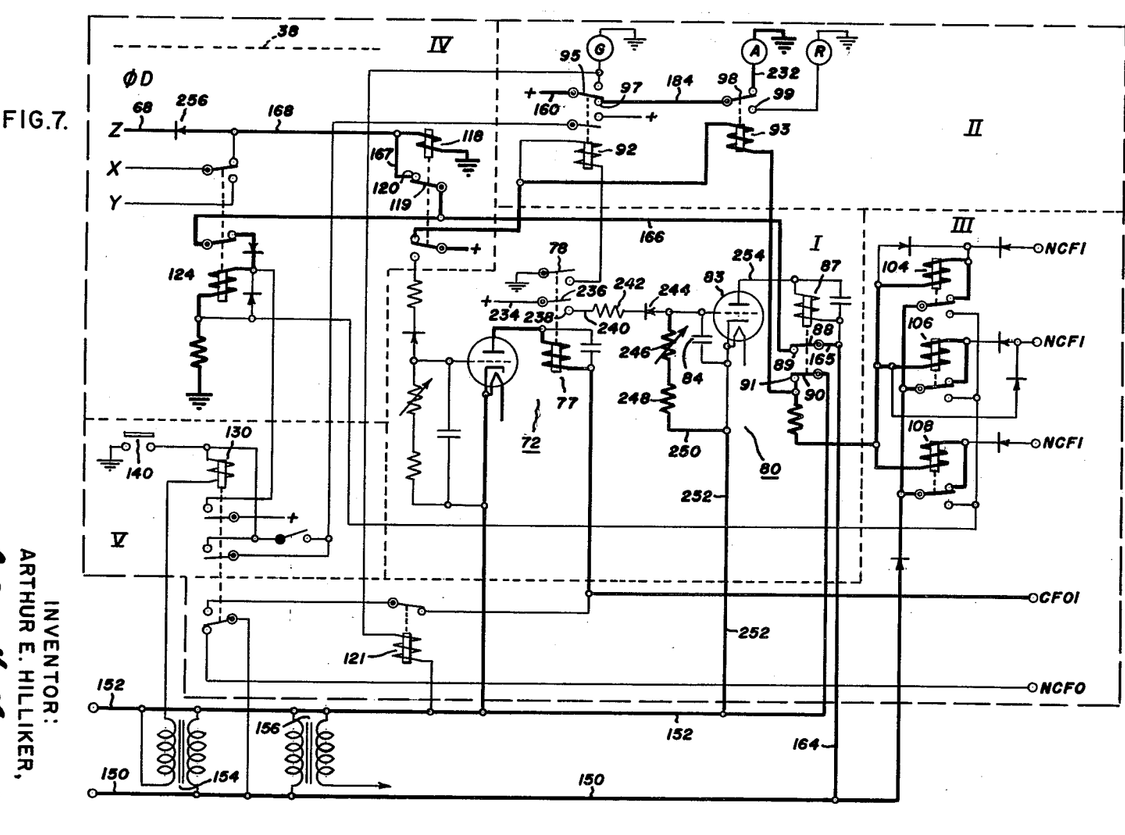
FIGURES 7 and 8 are circuit diagrams similar to FIGURE 3 with the circuit in different conditions.

Referring now to FIGURE 7, the energization of relay 77 will break the ground feed for the hold circuit which maintains relay 92 energized by opening the armature 78 which is connected to ground as indicated. Accordingly, relay 92 will become de-energized. The de-energization of relay 92 will complete a circuit from the hot point 160 through the armature 95 and contact 97 of relay 92, line 184, armature 98 and contact 100 of energized relay 93 to line 232 which is connected, as indicated by the letter A, to the amber, or clearance signal for the phase D movement thus energizing this signal and changing the signal indication for the phase D movement, indicated by the arrow 30 in FIGURE 1 from green to amber.

The energization of relay 77 also breaks the charge circuit for the capacitor 84 of the timer 80. This charge circuit comprises the hot feed at point 234, armature 236 and contact 238 of relay 77, line 240, resistor 242, rectifier 244 to the grid of tube 83 and the top of the main timing capacitor 84 for the timer 80. This condition of the phase D timer is shown in FIGURE 7 wherein the relay 77 is shown in the energized condition thus breaking the charge circuit and allowing the capacitor 84 to discharge through the circuit comprising line 240, variable resistor 246 and fixed resistor 248 in line 250, which is connected to the line 252 and to the ground line 152. Consequently, the time interval during which the amber signal is energized, is controlled by the setting of the variable resistor 246 and the value of the fixed resistor 248 and, similarly to the RC timer 72, and on completion of the discharge of the capacitor 84, the tube 82 will conduct current to energize the plate relay 87 of the RC timer 80.

Figure 8:
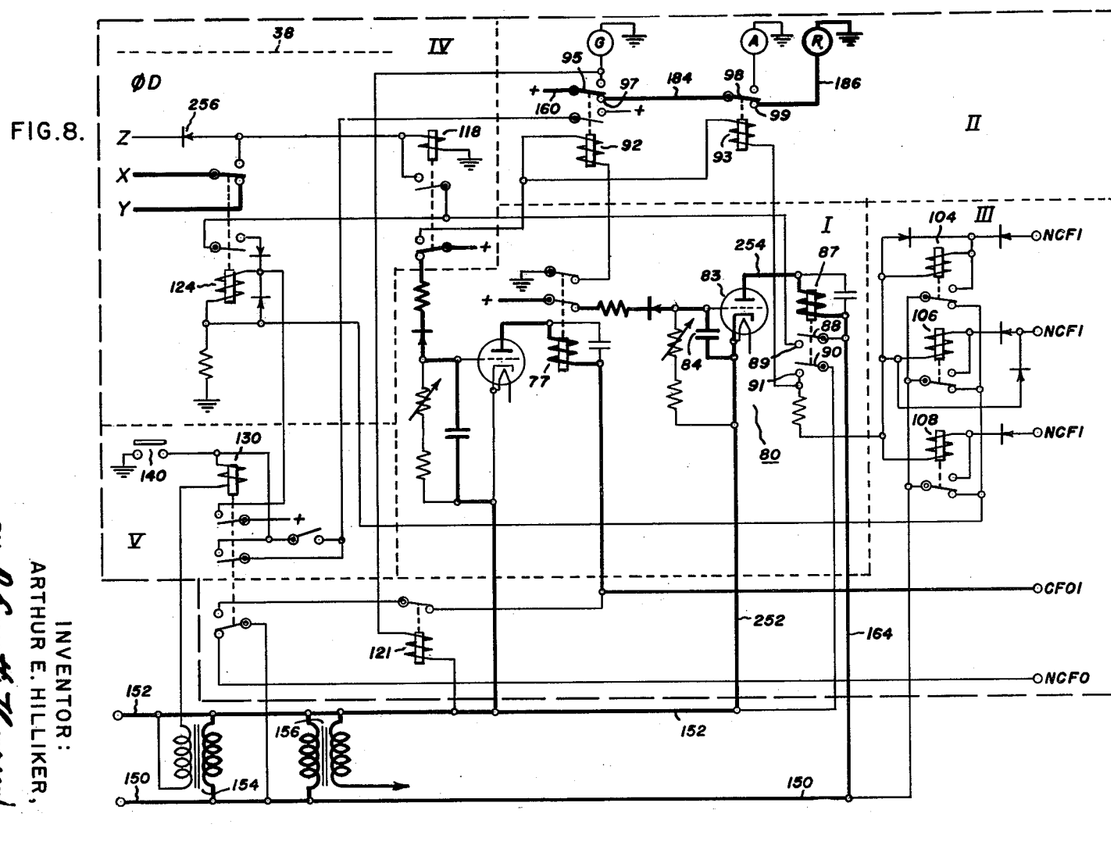

The energization of the plate relay 87 of RC timer 80, as shown in FIGURE 8, is accomplished when the tube 83 becomes conductive after the capacitor 84 has discharged to the point where the grid bias in the tube is sufficient to allow the tube to conduct current. At this point, a circuit is completed through the tube comprising hot line 150, line 164, coil of relay 87, line 254, tube 83 and line 252, which is connected to the common return line 152. This circuit energizes the relay 87 and moves the armatures 88 and 90 out of engagement with the fixed contacts 89 and 91 respectively. The opening of armature 88 breaks the circuts previously described for holding the relays 118 and 124 energized thus de-energizing these relays. In like manner the opening of the armature 90 breaks the ground side of the circuit for holding the relay 93 energized and for holding the permissive relays 104, 106 and 108 energized, thus de-energizing these relays.

The de-energization of relay 93 completes a circuit from the hot point 160 through the armature 95 and lower fixed contact 97 of de-energized relay 92, line 184, armature 98 and lower fixed contact 99 of de-energized relay 93 to line 186 which is connected, as indicated, by the circled letter R to the red signal for the phase D movement, thus energizing this signal. Consequently, it will be seen that the timer 80 functions to control the length of the amber, or clearance signal for phase D and also operates upon completion of the clearance interval to switch the signal from clearance to stop.

Referring again to FIGURE 7 it will be seen that the circuit comprising hot line 150, line 164, line 165, armature 88 and contact 89 of relay 87, line 166, through the armature 119 and contact 120 of energized relay 118 to line 167 and line 168, which is connected through the rectifier 256 in the line 68 to the terminal marked Z. Referring now to the master circuit shown in FIGURE 9, it will be seen that the terminal Z in line 68 is connected in the master circuit to line 258, which passed through a rectifier 259 and the coil of relay 260 to ground, as indicated, thus energizing the relay 260 and moving the armatures 261 and 262 out of engagement with the fixed contacts 263 and 264 respectively.

Figures 9, 10:
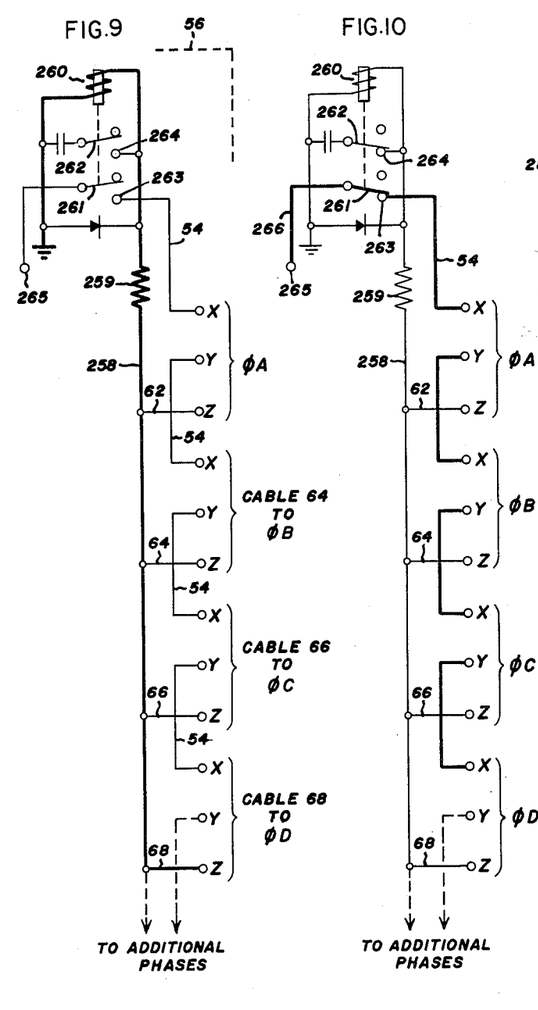
FIGURES 9 and 10 are circuit digrams of the master circuit for the complete controller wherein the heavy lines indicate portions of the circuit then conducting current.

However, as plate relay 87 in FIGURE 7 became energized this circuit would be opened by the movement of the armature 88 of relay 87 thus de-energizing the relay 260 in FIGURE 9. The de-energization of relay 260 completes a circuit, as shown in FIGURE 10, commencing at the hot point 265 through line 266, armature 261 and fixed contact 263 of de-energized relay 260 to line 54 which is connected to terminal X through the armature 125 and fixed contact 127 of de-energized relay 124 to the terminal Y in the line 54 which passes through each module in the manner previously described.

Accordingly, it is obvious that the hot feed on line 54 will be transferred successively in a logical, and in this case an alphabetical order, through each module of the controller. In the example illustrated, however, it has been assumed, referring now to FIGURE 11, that the phase A detector 144 has been actuated to energize the detector relay 130. The actuation of the detector relay 130 completes a circuit from the hot feed at point 270 through the armature 131 and fixed contact 132 of energized relay 130, line 272, line 274, which is connected through the rectifier 275 and the coil of relay 124 to line 276 which is connected through the resistor 172 to ground, as indicated, thereby energizing the relay 124. Accordingly, the hot feed at terminal X in line 54 passes through the armature 125 and upper fixed contact 126 of energized relay 124 to line 168 which is connected through the coil of relay 118 to ground, as indicated, thus energizing the relay 118.

Figure 11:
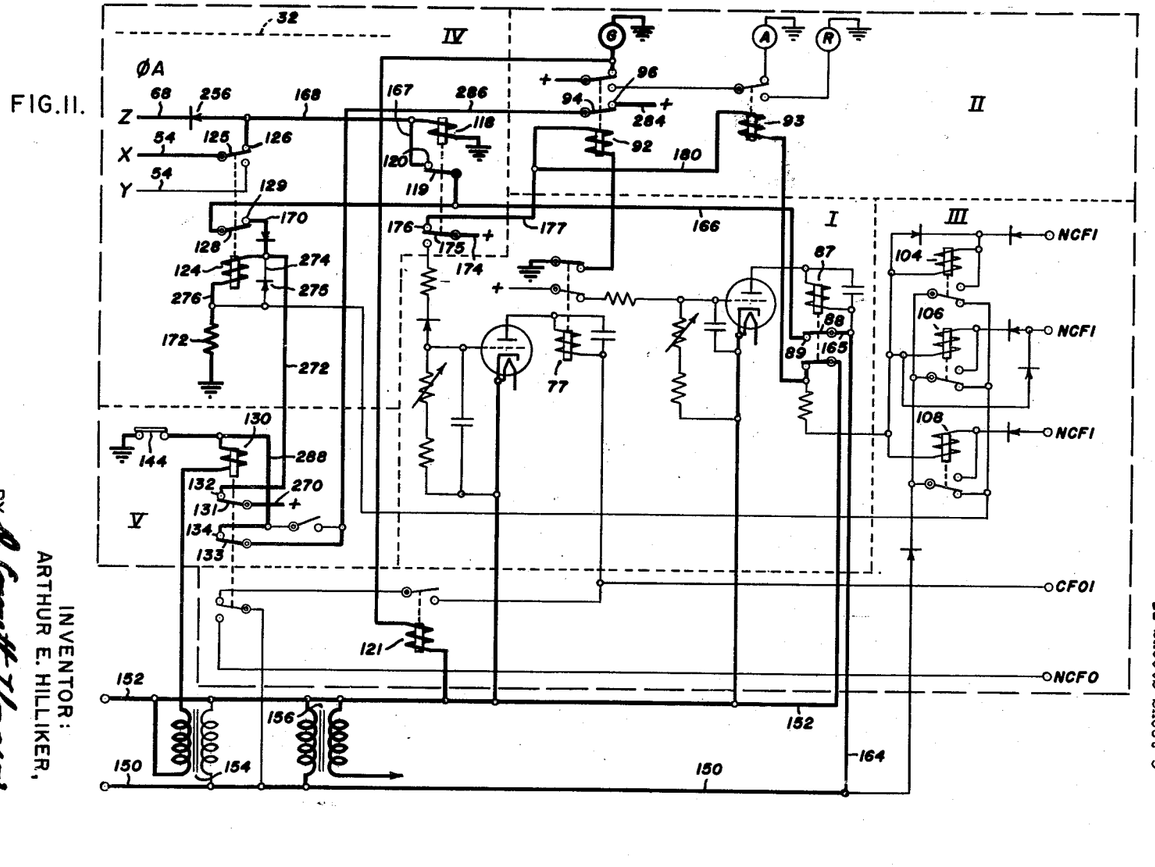
FIGURE 11 is a circuit diagram similar to FIGURE 3 with the circuit shown in a different condition.

The energization of the relays 124 and 118, as just described, completes a circuit comprising hot line 150, line 164, line 165, armature 88 and fixed contact 89 of relay 87, line 166, armature 119 and fixed contact 120 of energized relay 118, line 167 and line 168 through the coil of relay 118 to the ground point indicated to maintain the relay 118 energized. The hot feed placed on line 166 will also pass through the armature 128 and contact 129 of energized relay 124 and through line 170, line 274, rectifier 275, coil of relay 124, line 276 and resistor 277 to the ground point indicated to maintain the relay 124 energized. Finally, the hot feed on line 168, which maintains the relay 118 energized, will also pass through the line 68 and rectifier 256 to the terminal Z energizing the relay 260 in the master circuit through the circuit shown in FIGURE 12, which comprises the hot feed at terminal Z, line 68, line 258, resistor 259, coil of relay 260 to line 281 which is connected to the ground point, as indicated.

Referring again to FIGURE 11, the energization of the relay 118 transfers the hot feed at point 174 through the armature 175 and fixed contact 176 of energized relay 118, through lines 177 and 180 to energize the relays 92 and 93, as previously described. The energization of these relays will break the feed for the red signal for phase A and energize the green signal for phase A, as described in connection with FIGURE 3.

From the above, it will be understood that when the detector relay 130 of any of the phase modules becomes energized, it will be maintained in the energized state by a feed originating at the ground point 284, armature 94 and fixed contact 96 of relay 92, line 286, armature 133 and contact 134 of energized relay 130 to line 288 which is connected through the coil of relay 130 to line 215 which is connected to the secondary of the detector transformer 154 thus maintaining the detector relay 130 energized. It will be seen, therefore, that the detector relay 130 will be held energized until the green light of the particular phase becomes energized which will separate the armature 94 and contact 96 of the relay 92, thus breaking the hold circuit for the detector relay.

The operation of the controller described thus far has been on the assumption that the right-of-way signal display was resting on phase D with a call or detector actuation registered on phase A, and no calls on phases B, C or D. It will be understood that when there are no calls registered on these phases, the "no-call feed-out" circuit, NCFO, will place a hot feed on the phase A timer from each of the phases B, C and D timers. Referring to FIGURE 3 again, this circuit comprises hot line 150, line 192, armature 135, and fixed contact 137 of de-energized detector relay 130 and line 190. Referring to FIGURE 4 again, it will be seen that these feeds are connected through the permissive circuit, as shown in FIGURE 4, to the "no-call feed-in" circuits, NCFI. If, however, there is a call placed on any one of the phases B, C or D timers, the NCFO circuit will be broken by virtue of the energization of the detector relay which will break the circuit at the armature 135 of relay 130, so that one of the permissive relays 194, 196 or 198 in the timer which is presenting the right-of-way will remain de-energized after the RC timer 80 has timed out to energize its plate relay 87, which, as previously described, de-energizes the permissive relays by opening the ground side of the hold circuit.

Figure 13:
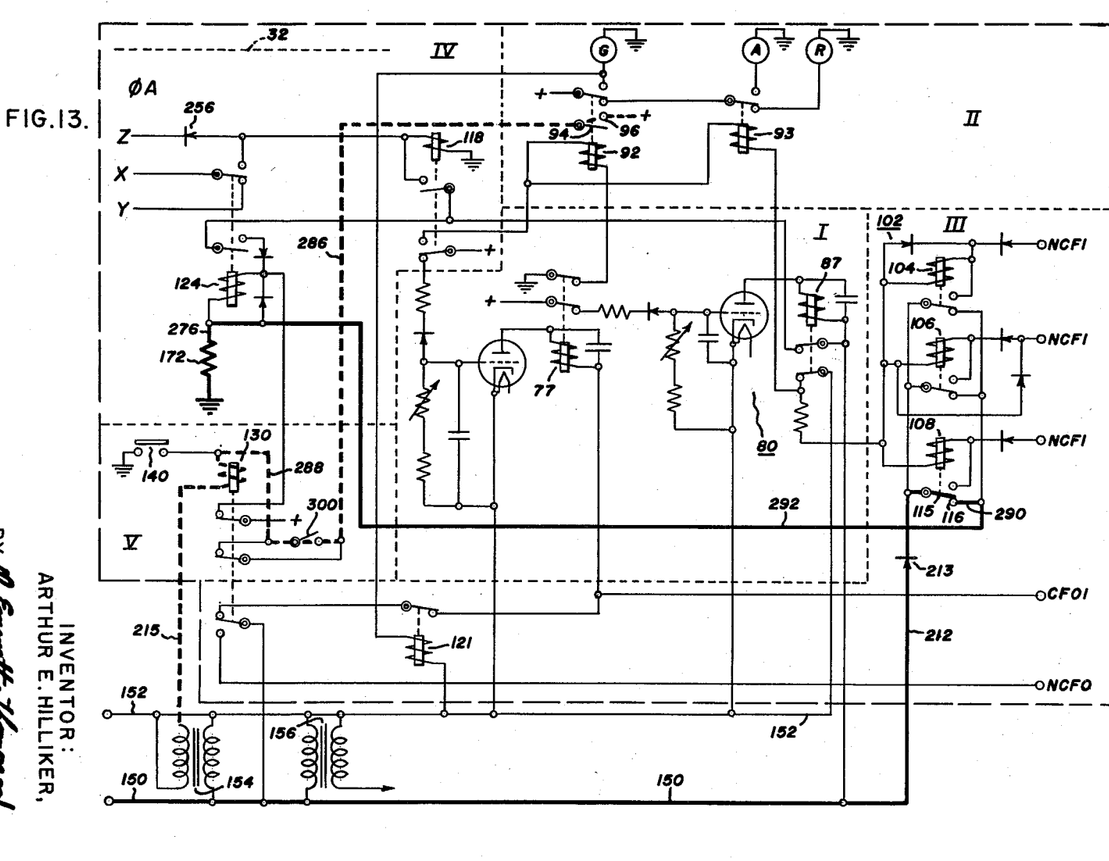
FIGURE 13 is a circuit diagram similar to FIGURE 3 with the circuit shown in a different condition.

Referring now to FIGURE 13, if one of the permissive relays remains de-energized, as for example permissive relay 108, a circuit is completed from the hot line 150, line 212, through rectifier 213, armature 115 and contact 116 of de-energized relay 108, line 290, line 292, which is connected to line 276 at the bottom side of the coil of relay 124, and through the resistor 172 to the ground point as indicated. Accordingly, this circuit comprises a blocking circuit which places the bottom of coil 124 at approximately 150 volts positive, thus preventing the relay from becoming energized by a detector actuation of the phase A detector 144 until this blocking circuit is opened. As the detector call on the phase controlling the permissive relay 108, which is de-energized, is answered, the permissive relay 108 will become energized, as previously described, to remove this blocking circuit, which in turn allows the relay 124 to be energized by a detector actuation of the detector 144 for phase A.

Figure 12:
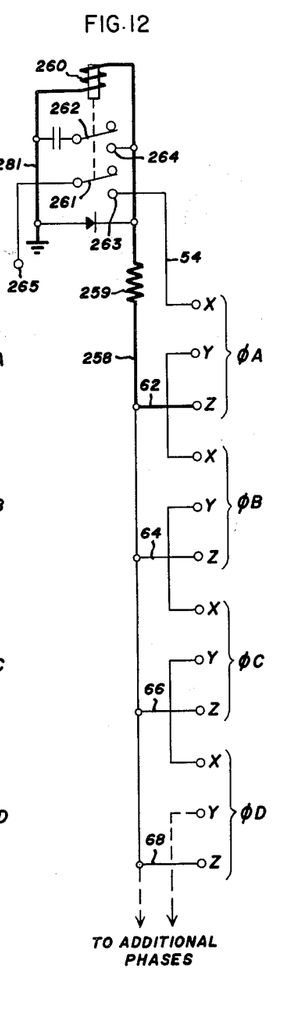
FIGURE 12 is a circuit diagram similar to FIGURES 9 and 10 with the circuit shown in a different condition.

Referring to the master circuit, shown in FIGURES 9, 10 and 12, it will be noted that the hot feed at point 265 passes through the lower armature 261 of relay 260 by line 54 through the timers in alphabetical, or pre-determined order, in this case the order being phase A, phase B, phase C and phase D. It will be understood, of course, that this order may be varied simply by connecting the timers in different sequence to the master circuit.

By virtue of the permissive relay circiut 102 in the timers and the permissive circuit connections between the timers in the unit 52, as shown in FIGURE 4 for example, it will be apparent, therefore, that the right-of-way cannot be displayed on any one phase more than in one complete cycle.

A controller cycle may be generally defined as the complete sequence of signal indications as displayed to a plurality of traffic movements. As pointed out in the preamble, however, all previous commercial traffic signal controllers have had a cyclical manner of mechanical operation. Accordingly, as hereafter used in the claims and specification, the controller cycle may be defined as a right-of-way signal display transfer sequence which commences during the right-of-way signal display to any of the controlled traffic movements and terminates whenever the right-of-way signal display can be, or is re-assigned, or returned to any of the traffic movements that has received the right-of-way signal display, since the commencement of the transfer sequence.

It will be apparent that the right-of-way will normally appear in a logical pre-determined, and in this case, alphabetical order among the phase A, B, C and D when the detector actuations are present on more than one phase. It will also be apparent that the controller will operate to give a right-of-way signal display transfer sequence in a non-logical order, and in this case, a non-alphabetical order, due to the fact that the permissive relay circiut 102 and the interconnections between the phase timers in the permissive unit 52 prevents any phase from receiving the right-of-way more than once in a complete cycle.

For example, when the controller is resting, or in a static condition with the right-of-way being displayed to phase D, and a call is received on phase B detector; and during the phase A amber, phase D is called; and during the phase B proceed signal indication a call is received on phase A and phase C, the right-of-way transfer sequence would now be phase D, B, A, C. In a period of continuous traffic so that all detectors were continuously actuated, the right-of-way sequence would be transferred in this order now instead of in the A, B, C, D order.

Referring to FIGURES 3, 5, 7, 8, 11 and 13, this non-logical transfer sequence, DBAC, will be effected due to the circuity of the individual phase timers and the connections therebetween in the permissive unit 52, together with the master unit 56. From the previous description, it will be recalled that when the detector associated with any one of the phase timers is actuated, the detector relay 130 will be energized, which will first serve to energize the transfer relay 124 and to break the "no-call feed-out" (NCFO) circuit, thus removing the hot feed from the permissive relay associated with the broken NCFO circuit.

As previously described, the detector relay 130 is maintained in the energized condition by the closure of its armature 133. Armature 135 moves into engagement with the contact 136 to complete the "call feed-out-in" (CFOI) circuit, which, as best seen in FIGURE 4, is connected to the CFOI circuits of the other timers thereby completing the plate circuit for the timer receiving the right-of-way signal display. From the previous description, it will, therefore, be understood that the completion of the plate circiut in the timer receiving the right-of-way will cause the proceed timer 72, upon completion of discharge of the timing capacitor 74, to be actuated energizing its plate relay 77. The energiziation of the plate relay 77 will, as previously described, cause the de-energization of the proceed signal relay 92, thus changing the signal display from green to amber on the timer which was displaying the proceed signal. As previously described, the amber interval will be timed by timer 80, and upon completion of this interval, the amber signal relay 93 will be de-energized to change the signal display from amber to red. During both the green and amber signal intervals, however, as best seen in FIGURE 3, a hot feed is placed on the line 68 in the manner previously described. This hot feed serves to energize the relay in the master unit 56. It will, therefore, be understood that during the right-of-way signal display interval (which comprises both the procced and clearance signal intervals) the hot feed from the point 265 in the master circuit has been disconnected from the line 54. Referring again to FIGURE 3, a hot feed on the line 54 will be transferred in the phase timer receiving the detector actuation by virtue of the energization of the transfer relay 124 to energize the starting relay 118. As previously set forth, the energization of the starting relay 118 causes the right-of-way signal display to be transferred from the timer previously having the right-of-way signal display to the timer receiving the detector actuation.

As above set forth, however, upon completion of the amber signal in the timer having the right-of-way signal display, the hot feed will be removed from the line 68 by virtue of the energization of the amber timer plate relay 87, thus de-energizing the master unit relay 260. Accordingly, it will be understood that the master circuit relay 260 is normally energized preventing the hot feed at 265 from being connected to the line 54, and the relay 260 is only de-energized upon completion of the amber signal, thus momentarily connecting the hot feed to the line 54. This hot feed on the line 54 will be connected through the phase timers in a pre-determined order depending upon the order in which they are connected to the master circuit, and in the case shown and described, this order will be phase A, phase B, phase C and phase D. This hot feed will be utilized in the first of these timers having a detector actuation to energize the starting relay 118.

However, it will be noted and recalled that a detector actuation in any one of the timers will break the NCFO circuit, thus keeping the permissive relay in the other timers associated or connected to that particular timer from being energized. As previously described, this will in turn energize the blocking circuit to prevent the energization of the transfer relay 124, thereby permitting the hot feed on the line 54 to pass through any phase timer having one or more of its permissive relays de-energized.

It should be noted at this point that the energization of the proceed relay in the timer having the right-of-way signal display will, through the circuit previously described, energize the relay 121. The energization of the relay 121 will break the connection between the hot feed on line 192 and the plate circuit for the proceed timer 72 thereby preventing the plate circuit from being completed through the contacts of the relay 121 in the event of additional detector actuations on the detector means associated with the timer displaying the proceed signal.

It will be obvious, therefore, that upon completion of the amber signal in the timer having the right-of-way signal display, the master relay will be de-energized to connect the hot feed from the master unit to the line 54 and through the phase timers. This hot feed will then cause the timer having all of its permissive relays energized to receive the transfer of the right-of-way signal display by virtue of the energization of the starting relay 118.

It will be understood that the NCFO circuit in the timer receiving the green or proceed indication will be re-established immediately upon the energization of the proceed signal for that timer since the energization of the proceed signal breaks the ground side of the hold circuit for the detector relay 130 by separating the proceed relay contacts 94 and 96. This serves to de-energize the detector relay which causes the armature 135 to move back into engagement with the contact 137 thereby connecting the hot feed on line 192 to the NCFO line 190, thereby energizing the permissive relays associated with this timer in each of the other timers, thus in effect indicating to the other timers that the first timer has received the proceed indication.

Accordingly, in periods of heavy continuous traffic the right-of-way signal display transfer sequence may be in a non-logical sequence, or order, and is established by the first transfer sequence which creates the non-logical cycle. It will be understood that in such a case a lull in traffic in the intersection may operate to restore a logical transfer sequence if the phase detectors are actuated in the logical sequence after the lull in traffic actuations.

Therefore, as will be obvious, the modular controller comprising the subject of this invention is completely flexible in that the right-of-way may be transferred from one phase directly to another non-successive, or non-following phase without the necessity for passing through not-called and unused phases. In addition, the controller will normally transfer the right-of-way signal display in a logical pre-determined sequence, or order, except in the instance of heavy traffic at the intersection in a non-logical order, in this case the controller will operate to transfer the right-of-way signal display in the non-logical order.

Referring to FIGURE 13, each of the phase timers is provided with a recall, or program switch 300, which when closed completes a circuit, as indicated by the dashed heavy lines, from the secondary of the detector transformer 154 through line 215 and the coil of the detector relay 130, line 288, through the closed recall switch 300 to line 286, which is connected, as previously described, to a ground point through the contact 96 and armature 94 of relay 92 energizing the detector relay 130. As will be obvious, the closure of the recall, or program switch 300 serves to continuously place a call on the detector relay, so as to maintain it in an energized state until the green signal for the phase timer becomes energized, which opens the ground circuit. It will be obvious that by closing one or more of the program switches 300, one or more of the phases may be placed on a pre-timed basis so as to receive the right-of-way signal display at least once each cycle.

It is to be understood that the controller comprising the object of this invention is expandable and may be expanded to control any number of movements merely by adding a phase timer for each additional movement, and by adding on to the master and permissive circuits the appropriate wiring connections, and by adding a permissive relay for the permissive circuit 102 for each added timer in each of the other timers. It will be obvious, therefore, that each timer of the controller will have one less permissive relay in the permissive relay circuit 102 than the total number of the phase timers. For example, if the controller comprises 5 phase timers, each phase timer will have 4 permissive relays.

It is also to be understood that the phase timers of any controller can be connected in a manner so as to give a simultaneous right-of-way indication to two non-conflicting phases, or movements, merely by connecting two or more of the phase timers to the same positions in the master circuit.

The modular comprising the preferred embodiment of the invention eliminates the requirement for special minor movement controller timers and pedestrian timers, as was the case with prior stepping switch or cam type controllers, due to the fact that phase timers may be added or subtracted from the controller with no effects on the other phase movements. Also, all red clearance timers may be added to the controller in a conventional manner. Finally, it is to be understood that the assignment of the right-of-way can be supervised by a background cycle originating from a local or master dial unit in a conventional manner so as to give an interconnected progressive traffic control system.

What I claim is:

1. A modular traffic signal controller for an intersection having two or more conflicting movements for according a right-of-way signal display to said movements, said controller comprising a phase timer individual to each of said movements, traffic signal means and detector means associated with each movement, said signal means being connected to signalling means in said phase timer, said detector means being connected to detecting means in said phase timer, each phase timer in said controller being connected with a master unit, means in said master unit for placing a hot feed on said phase timers in a predetermined order, said hot feed being connected to starting means in each of said timers and being normally connected by transfer means in said starting means to the other of said timers in said predetermined order, said detecting means operating upon actuation of the detector means associated with said timer to energize said transfer means in said starting means to prepare said starting means for operation, permissive means in said phase timer interconnected with permissive means in each of said other phase timers and operating upon energization to energize said starting means, the energization of said starting means energizing signalling means to change the signal display for the movement associated with said timers from stop to proceed and timing means energized upon energization of said starting means to provide the proceed signal with a minimum time interval of energization, said timing means becoming inoperable upon completion of said minimum timing interval in the absence of any actuation of the permissive means of any of said other timers, said timing means operating upon actuation of the detector means associated with one of said other timers to change the signal display from proceed to clearance and to time the clearance signal display interval, and upon completion of said clearance interval to change the signal display from clearance to stop and de-energize said signalling and timing means.

2. The modular traffic controller of claim 1, wherein the energization of said starting means energizes disconnect means in said master unit to interrupt said hot feed to said phase timers during the right-of-way signal display to any of said movements.

3. A modular traffic signal controller for an intersection having two or more conflicting traffic movements for according a right-of-way signal display to said movements in cyclical fashion, said controller comprising a plurality of phase timers individual to each of said movements, each of said movements having traffic signal means and traffic detector means associated therewith and connected to the phase timer individual to said movement, each of said phase timers being interconnected to a master unit to place a hot feed on each of said timers in a predetermined order, said hot feed being connected to starting means in said timers, and being normally connected by transfer means in said starting means to the other of said timers in said predetermined order, detecting means in said timers for receiving an actuation of the vehicle detector means connected to said timers, said detecting means operating upon actuation of said detector means to actuate said transfer means in said starting means in said timer to place said starting means in a condition for operation, permissive means in said phase timer being interconnected with permissive means in each of said other phase timers and operating when energized to energize said starting means, the energization of said starting means actuating said signalling means and timing means to energize and time the right-of-way signal display for the movement receiving the actuation of the detector means.

4. The controller of claim 3, wherein said detecting means is provided with recall means for placing a continuous actuation on said detecting means.

5. The controller of claim 3, wherein said timing means is operable to continuously maintain the proceed signal display energized for the timer last receiving a vehicle actuation of its associated detector means in the absence of detector actuations upon the other phase timers.

6. The controller of claim 3, wherein said permissive means is energized only upon completion of the timing of the right-of-way signal display in each of said other phase timers receiving an actuation of its associated detector means.

7. The controller of claim 6, wherein said permissive means is operable upon the actuation of the detector means associated with any of the other of said movements to energize the timing means of the timer for the movement receiving the right-of-way signal display upon completion of said right-of-way signal display, and to de-energize said signal means, the de-energization of said timing means being operable to de-energize said starting means.

(References on following page)

References Cited by the Examiner

UNITED STATES PATENTS

| | | | |
|---|---|---|---|
| 2,114,968 | 4/38 | Nein | 340—35 |
| 2,883,644 | 4/59 | Barker | 340—36 |
| 2,883,645 | 4/59 | Vivier | 340—36 |
| 3,078,440 | 2/63 | Hilliker | 340—37 |

FOREIGN PATENTS 567,762  3/45  Great Britain.

NEIL C. READ, *Primary Examiner.*

THOMAS B. HABECKER, *Examiner.*

UNITED STATES PATENT OFFICE
CERTIFICATE OF CORRECTION

Patent No. 3,191,148

June 22, 1965

Arthur E. Hilliker

It is hereby certified that error appears in the above numbered patent requiring correction and that the said Letters Patent should read as corrected below.

Column 1, line 52, for "Jewers'" read -- Jeffers' --; line 53, for "cntrollers" read -- controllers --; column 4, line 28, after "FIGURE 1," insert -- in --; colunn 8, line 60, for "circiut" read -- circuit --; line 65, before "in" insert -- onc --; column 9, lines 12 and 46, for "circiut", each occurrence, read -- circuit --.

Signed and sealed this 16th day of November 1965.

(SEAL)
Attest:

ERNEST W. SWIDER
Attesting Officer

EDWARD J. BRENNER
Commissioner of Patents